United States Patent [19]
Starr

[11] Patent Number: 5,668,555
[45] Date of Patent: Sep. 16, 1997

[54] IMAGING SYSTEM AND APPARATUS

[76] Inventor: Jon E. Starr, 5623 Rush Ave., Columbus, Ohio 43214

[21] Appl. No.: 522,997

[22] Filed: Sep. 1, 1995

[51] Int. Cl.$^6$ .............. G01S 7/20; G01S 13/06; G01S 13/89

[52] U.S. Cl. .............. 342/179; 342/180; 342/22; 342/197

[58] Field of Search .............. 342/179, 180, 342/28, 22, 190, 197

[56] References Cited

U.S. PATENT DOCUMENTS

| | | | |
|---|---|---|---|
| 4,673,929 | 6/1987 | Nelson et al. | 340/703 |
| 4,692,878 | 9/1987 | Ciongoli | 364/518 |
| 4,803,464 | 2/1989 | Holmes et al. | 340/732 |
| 4,847,608 | 7/1989 | Bouron | 340/747 |
| 4,873,652 | 10/1989 | Pilat et al. | 364/518 |
| 4,916,536 | 4/1990 | Kerr et al. | 358/107 |
| 5,001,348 | 3/1991 | Dirscherl et al. | 250/372 |
| 5,121,125 | 6/1992 | Guerci et al. | 342/204 |
| 5,121,469 | 6/1992 | Richards et al. | 395/129 |
| 5,148,591 | 9/1992 | Pryor | 29/407 |
| 5,155,683 | 10/1992 | Rahim | 364/424.02 |
| 5,194,908 | 3/1993 | Lougheed et al. | 356/28 |
| 5,218,457 | 6/1993 | Burkhardt et al. | 358/448 |
| 5,274,271 | 12/1993 | McEwan | 307/108 |
| 5,361,070 | 11/1994 | McEwan | 342/21 |
| 5,460,758 | 10/1995 | Langer et al. | 264/401 |
| 5,504,714 | 4/1996 | Shonting | 367/13 |

OTHER PUBLICATIONS

D. Stover, "Radar on a Chip: 101 Uses In Your Life", Popular Science, Mar. 1995, pp. 107–110, 116–117.

*Primary Examiner*—John B. Sotomayor
*Attorney, Agent, or Firm*—Kwadjo Adusei-Poku; Porter, Wright, Morris & Arthur

[57] ABSTRACT

A three dimensional imaging system that utilizes an ultra-wideband radar circuit, a focused radar antenna, an erasable programmable read only memory (EPROM) means which includes a translational software program for translating radar signals received from the radar circuit into signals representing three dimensional coordinates, a memory means 13 for storing the translated signals, and a Computer Aided Design (CAD) program means for processing the translated signals into three dimensional images.

8 Claims, 4 Drawing Sheets

IMAGING SYSTEM AND APPARATUS

FIELD OF THE INVENTION

The present invention relates to imaging systems and more particularly to imaging systems for biologic, topographic and various structural applications.

BACKGROUND AND SUMMARY OF THE INVENTION

In the field of image reproduction, particularly as it relates to biologic applications, the most widely used conventional imaging devices include x-ray, ultrasound and magnetic resonance imaging (MRI) systems. Although these systems reproduce an image usually associated with tissue structure and the like, each have significant drawbacks.

The use of X-ray systems has associated therewith the potential for attendant biologic harm, image distortion, prolonged reproduction time, and is limited to two dimensional image reproduction. Although MRI systems produce images within a larger spectrum, image reproduction is not available on a real-time basis and the acquisition as well as operational expenditures of MRI systems is cost prohibitive. Image resolution produced by ultrasound systems is subject to signal distortion by various tissue structures. In addition, ultrasound imaging systems have unknown biologic risks. Moreover, each of these systems, x-ray, MRI and ultrasound, require contrast media for accurate image visualization.

In contrast, the present invention has no adverse biologic impact, includes accurate three-dimensional structure localization with minimal distortion capable of use without contrast media, provides real time mass or component imaging both for study, diagnosis, and intervention, and provides a cost estimated to be less than 10% of conventional CT scanning or MRI systems. Scanning rates obtained from utilization of the present invention are adequate to provide both static and dynamic imaging. Only fluoroscopy and angiography have real-time imaging capabilities, however these systems are only two dimensional. In contrast, the present invention provides three dimensional images in real-time.

Additionally, an embodiment of the present invention is utilized in construction related applications. Conventional mechanisms utilized for site surveys and topographic analysis are labor-intensive requiring individual point measurements, plotting and commonly include several data transcriptions. Accuracy verification of site surveys performed by these conventional methods are often incomplete and inaccurate. Similarly, the building resale and reconstruction industries are forced to rely on a comparison of original architectural or engineering blueprints —if such exist— together with the present visual structure in planning a renovation project. Modifications during the original construction not included in the blue prints and alterations performed subsequent to the original construction, contribute to hidden parameters within the structure. Even if blue prints are available and provide a reflection of the actual gross structure, minor variations in actual construction are the rule rather than the exception whether it be the location of an individual stud or wire, or the size/type of non-visible construction materials employed. Short of destructive exposure of all structural elements, preparation for reconstruction/modification are forced to include planning for "unknowns." This additional preparation is costly and may force complete design alteration.

Accordingly, it is an object of the present invention to provide an apparatus and system which produce images corresponding to the composition of a given object or structure.

Another object of the present invention is to provide a system which translates radar signals into images with minimal visual distortion.

An additional object of the present invention is to combine an ultra-wideband rapid sampler radar motion sensor circuit with computer aided design software to provide fine resolution imaging.

Another object of the present invention is to provide an imaging system for use in the biologic sciences.

Yet another object of the present invention is to provide a biologic imaging system which produces an emission level in the range of one microwatt thereby qualifying it as a medically harmless diagnostic tool while providing fine resolution reproduction.

An additional object of the present invention is to provide three dimensional imaging for use in topographic surveying.

A still further object of the present invention is to provide imaging capabilities for use in architectural and structural reproduction as well as various other image reproduction applications.

Another object of the present invention is to provide "real-time" investigation of anatomic, physiologic, and pathologic processes with superior structural resolution.

A further object of the present invention is to provide tissue differentiation imaging, motion and blood flow visualization, and accurate three dimensional structure location for comparative analysis and invasive intervention.

A further object of the present invention is to provide an imaging system which is capable of adaptation to accommodate various degrees of resolution.

SUMMARY OF THE INVENTION

The foregoing objectives are achieved in an imaging system which includes an ultra-wideband rapid sampler radar circuit which produces, transmits and receives an electrical voltage pulse. A programmable memory means is employed to receive and translate the electrical voltage pulse from the radar circuit into signals representing three dimensional coordinates of a particular object being scanned. A memory means stores the translated electrical voltage pulse. A computer-aided design means for receiving and processing the translated radar signal into an image representative of an area on and within an object or structure. The radar circuit includes a pulse repetition interval generator, a fixed reference delay means connected to the pulse repetition interval generator, a transmit pulse generator connected to the reference delay means, a transmit antenna connected to the transmit pulse generator, an adjustable delay means connected to the pulse repetition interval generator, a gating pulse generator connected to the adjustable delay means, an ultra-wideband radar receiver connected to the gating pulse generator, and a receiver antenna connected to the ultra-wideband receiver.

DESCRIPTION OF THE PREFERRED EMBODIMENT

Recent developments in radar transducers include microchip devices which emit radar signals with a multiplemagnitude safety factor and are capable of identifying direction, distance, and density. The present invention utilizes these devices in an apparatus and system which produces virtually instantaneous three dimensional imaging. An apparatus and system is provided which combines an ultra-wideband rapid sampler radar motion sensor circuit with computer aided design technology to produce fine resolution imaging of various structures. It will be apparent from the description herein that the present invention is capable of producing three dimensional images with a resolution to at least one (1) millimeter.

The radar circuit useful in the present invention is in microcircuit form such as of the type disclosed in U.S. Pat. No. 5,274,271 entitled Ultra-Short Pulse Generator issued to McEwan on Dec. 28, 1993 and U.S. Pat. No. 5,361,070 entitled Ultra-Wideband Radar Motion Sensor issued to McEwan on Nov. 1, 1994 (hereinafter "the '070 patent").

Figure 1:
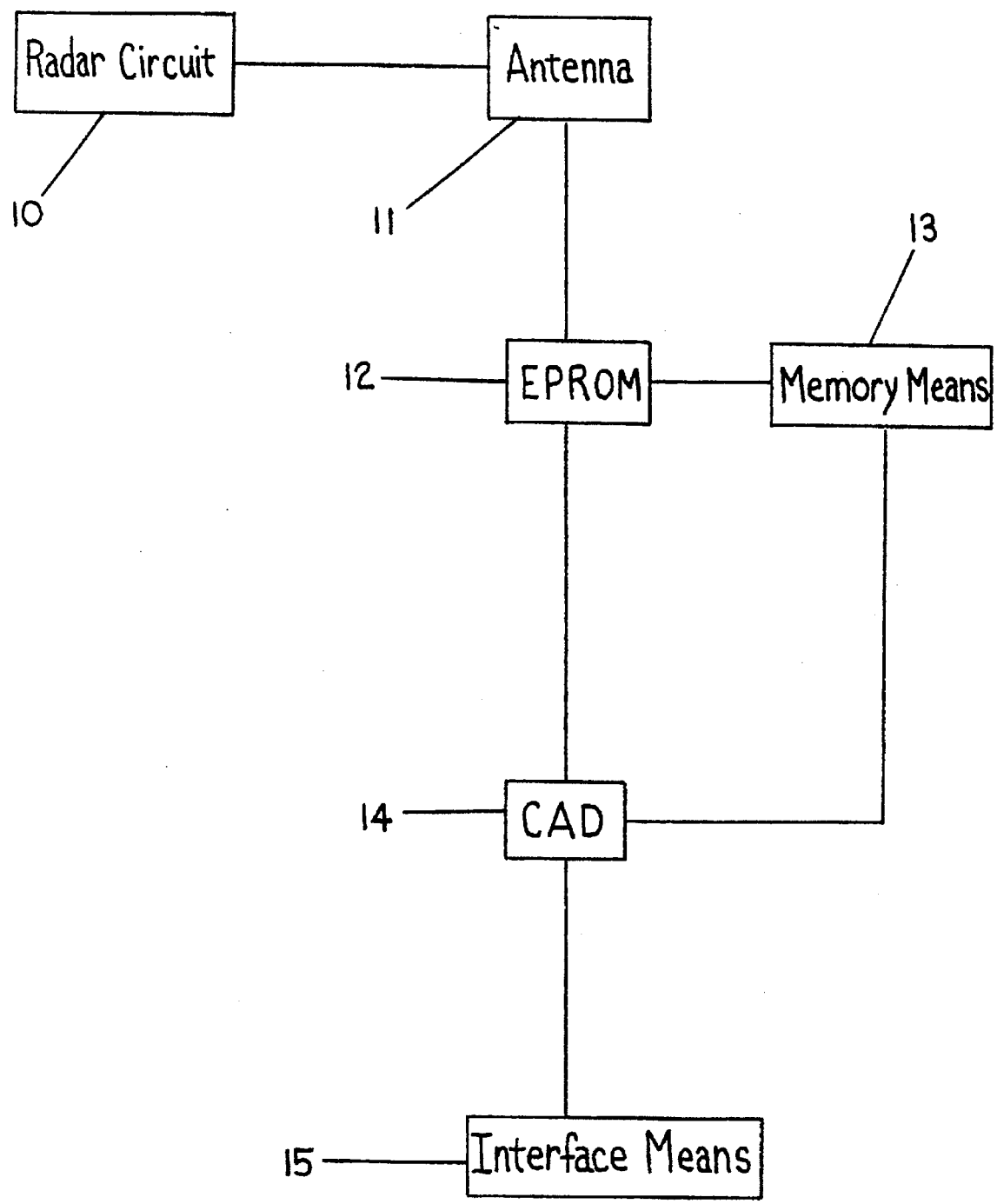
FIG. 1 is a block diagram of the system of the present invention.

FIG. 1 illustrates a block diagram of the present invention which includes an ultra-wideband radar circuit 10, a focused radar antenna 11, an erasable programmable read only memory (EPROM) means 12 which includes a translational software program for translating radar signals received from radar circuit 10, a memory means 13 for storing the translated radar signals, a Computer Aided Design (CAD) program means 14, and an interface means 15 for attachment to various peripheral and processing mechanisms. The individual imaging unit is physically contained within a housing.

The electrical components included in the ultra-wideband radar circuit 10 (as disclosed in the '070 patent) produce high speed voltage pulses in a much shorter signal spectrum than conventional radar devices. The voltage pulse is one-billionth of a second long and is emitted by the radar circuit about a million times each second. Because the radar circuit operates across a wider band of frequencies, it is less susceptible to interference as compared with conventional devices. Moreover, because the radar circuit operates at a lower frequency band, the signals are capable of penetrating water, ice, mud and similar media.

Figure 2:
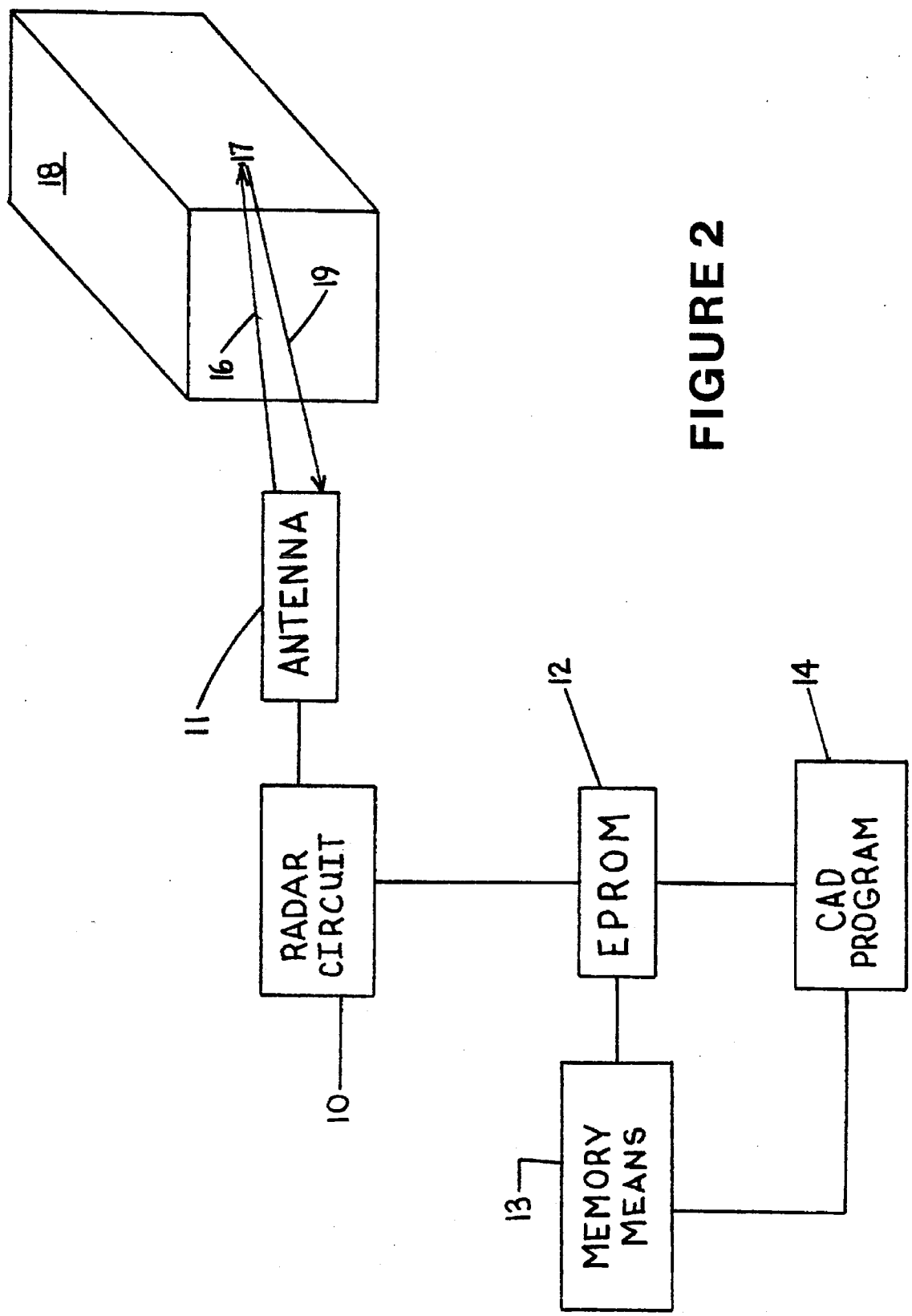
FIG. 2 illustrates the electrical voltage pulse operation and associated signal processing of the present invention.

As illustrated in FIG. 2, radar circuit 10 generally operates as a pulse echo system which clocks the two-way travel time of an electrical pulse. The circuit 10 produces an electrical voltage pulse 16 and transmits the pulse by way of antenna 11 to a point 17 within a tissue structure 18. The return pulse signal 19 is received by an antenna and transmitted from the radar circuit to EPROM 12. In the preferred embodiment, the antenna is included within radar circuit 10 and is approximately 1.5 inches in length and is capable of receiving radar signals from a distance of about 200 feet. As each pulse returns to the circuit from point 17, a sampling gate within the radar circuit receives that particular signal and ignores all other signals emitted by the circuit. This random emission process differentiates a particular pulse from the approximately one million other pulses emitted each second by an individual circuit. A translational program is downloaded to an EPROM which translates each pulse signal received from the radar circuit into X, Y, and Z coordinates corresponding to the position of point 17 within tissue structure 18 prior to transmission into the CAD program means 14.

The present invention utilizes a plurality of radar circuits in a rotational arrangement to form multiple circuit arrays. Each of the circuits within an array produce, transmit and receive voltage pulses and utilize the random emissions process to differentiate a particular pulse among the millions of pulses transmitted from each array each second. Each pulse is translated into its respective X, Y and Z coordinates by the translational program within the EPROM means and transmitted for immediate incorporation into the CAD program for parallel image processing.

In one embodiment of the invention, a mechanical scanning antenna array is utilized in which the X coordinate of an object to be detected is defined by the physical location of the antenna array. The Y coordinate of the object is determined by the distance from the antenna to the object in combination with the rotational angle of the antenna array along its Y axis at the time of signal detection. Similarly, the Z coordinate is determined by the distance from the antenna to the detected object in combination with the rotational angle of the antenna array along its Z axis at the time of signal detection. The X, Y, and Z coordinates are inputted into the translational EPROM and by way of conventional geometric calculations, the coordinates of the detected object are determined.

A fixed array may also be employed. In this manner, the X and Y coordinates of an object to be detected are defined by the physical location of the antenna array. The Z coordinate is defined by the distance from the detected object to the antenna array as determined by the echo pulse time of the transmitted electrical signal. The X and Y coordinates of the fixed antenna array may be stored within the EPROM for that particular array and calibrated upon displacement of the antenna array.

Automatic reference point "zeroing" within and between individual arrays, whether a fixed array or a mechanical array, as well as X, Y and Z coordinate calibration is incorporated into each scan cycle. Reference point zeroing is accomplished by including defined/measured distances from each antenna array and performing calibration procedures resonant within the EPROM. Reference point zeroing eliminates the need for mechanical synchronization of each array. The circuit arrays are also arranged in a split cross configuration to provide sectoring of a scanned area thereby reducing the scan time as compared with conventional devices. In addition, the present invention allows a user to select/isolate a single radar signal representing a particular sector of an object to be scanned from a particular radar circuit for "magnification" thereof. Thus, multiple radar circuits are arranged to effectuate scanning of a large area or to effectuate very detailed resolution of a small area.

Figure 3:
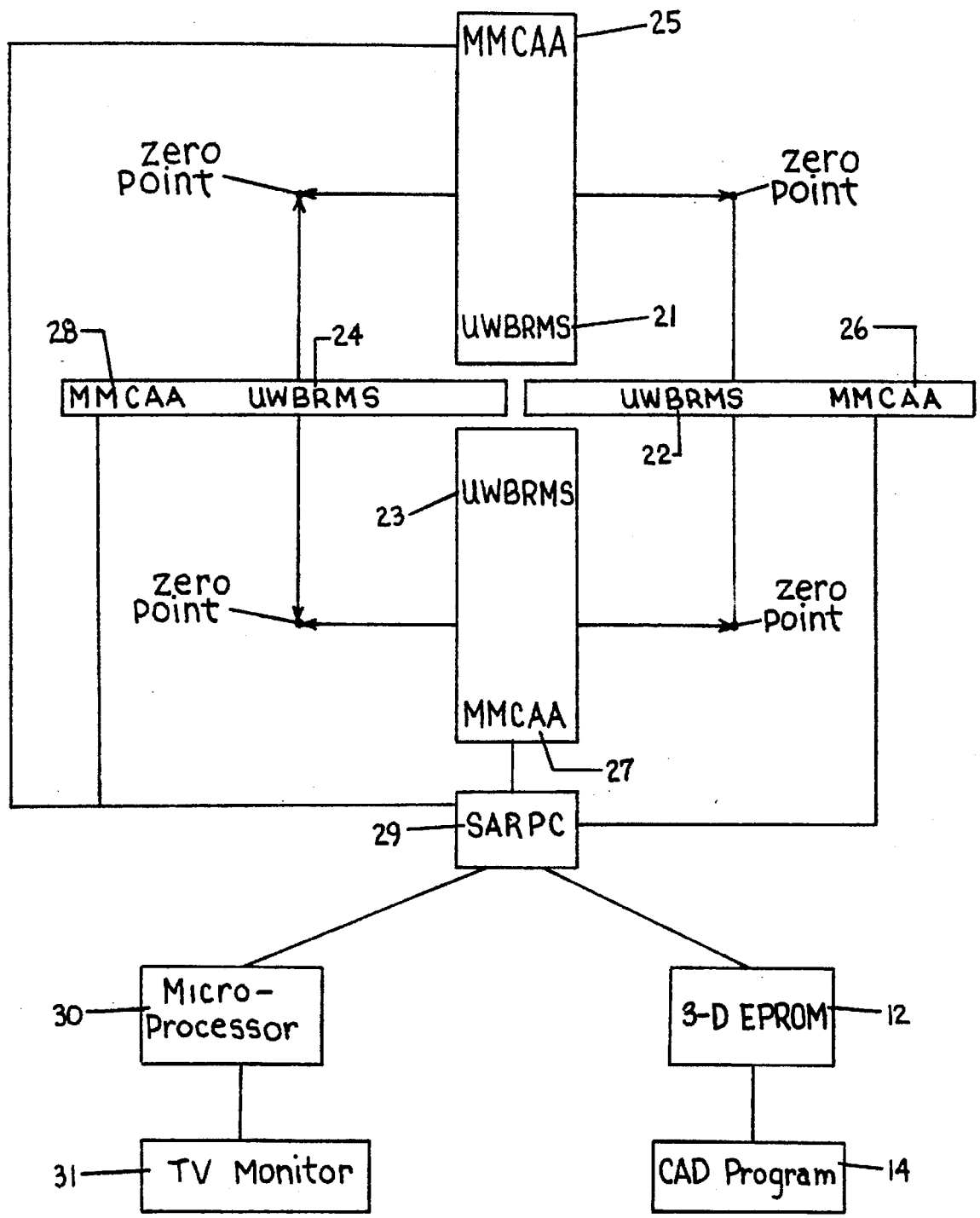
FIG. 3 is a schematic diagram of the components included within the present system.

FIG. 3 illustrates ultra-wideband radar motion sensors ("UWBRMS") 21, 22, 23 and 24 and multiple microchip antenna arrays ("MMCAA") 25, 26, 27 and 28 as well as each array's reference zero point. Each array includes multiple radar circuits with signal linkage capabilities to provide signal switching between and among the arrays. The arrays may be mounted in a cylindrical fashion and configured to provide three dimensional signal detection with limited angle. Alternatively, the MMCAA's may be positioned in a split cross configuration to provide sectoring of the object to be scanned. The use of synthetic aperture radar processor circuitry (SARPC) 29 contributes to signal detail received from each MMCAA. As previously described, EPROM 12 translates the SARPC signal into X, Y, and Z coordinate information for introduction into CAD program means 14. A microprocessor based means 30 receives the signals for SARPC 29 and produces an image in real time by way of a monitor 31 or like display device.

Figure 4:
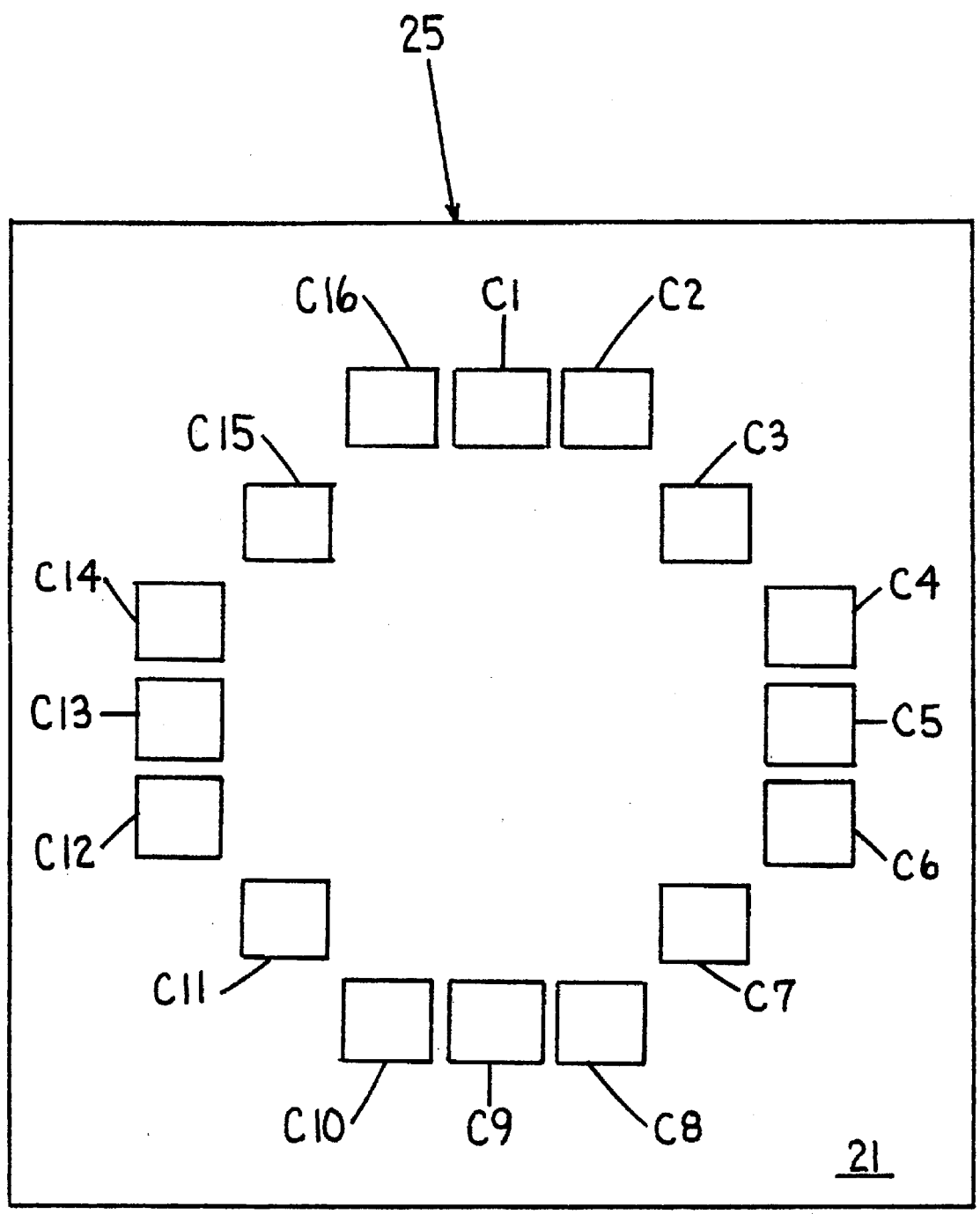
FIG. 4 is a top view of a radar circuit array arranged on a planar substrate.

By way of example, array 25 comprises one or more radar circuits as illustrated in FIG. 4. Each circuit is included within a microchip C1 . . . C16 and each microchip is arranged on a 24"×24" substrate 21 in a hexagonal fashion.

Thus, the circuits are located at regularly spaced intervals on the substrate (e.g., one chip per 16 square inches of substrate, or 36 microchips on a 24"×24" substrate). In this manner, an array is formed which is capable of scanning an entire chest and abdomen area or up to two thirds of a spinal area. The number of microchips per unit is dependent on the resolution desired for a particular application. For example, a microchip is capable of detecting differences in tissue density in the order of ½ millimeter from 2 inches to 30 inches thereby only requiring a single microchip. Additional chips are used to improve accuracy and resolution at speeds necessary to eliminate motion blur (e.g. heart motion, lung motion, blood flow and the like).

As disclosed in the '070 patent, the radar circuit utilized in the present invention is powered by a pair of AA batteries for 8 years and has a present cost of approximately ten dollars ($10.00). The circuit is a rapid-fire sampler and is capable of analyzing extremely short radio pulses. Thus, the radar circuit provides accuracy at low power and at a lower operating cost as compared with conventional imaging systems. Moreover, because the radar's average emission level is within the range of one microwatt, it qualifies as a medically harmless diagnostic tool.

EXAMPLE 1

In one embodiment of the present invention, the radar circuit arrays communicates with a CAD program which is resonant in a remote microprocessor. The radar signals translated by the EPROM into signals representing X, Y and Z coordinates are transmitted via a connecting means to the microprocessor interface. The CAD program receives the translated radar signals which correspond to a plurality of signals transmitted and received from each of the plurality of radar circuits present in an array and performs parallel processing operations to provide a three dimensional image of an area being scanned. The CAD program also identifies biologic tissue types based on signal return and assigns color parameters consistent with the respective tissue types. The microprocessor utilized may be resonant in a personal computer. In this manner, a physician with a standard personal computer could utilize the applicant's invention as part of an office visit for virtually all pathologies. Alternatively, the images obtained from the CAD program can also be stored as a bitmap file for later analysis and manipulation.

Accurate, fine resolution, real-time imaging provided by the present invention is not offered by conventional imaging systems. By way of example, the preferred embodiment of the present invention utilizes a plurality of radar circuits to scan a millimeter in $\frac{1}{1000}$ of a second. Therefore, the overwhelming majority of total chest and abdomen scans take less than $\frac{457}{1000}$ of a second (covering approximately 18 inches measured from front to back). This effectively eliminates cardiac motion blurring for heart rates up to 130 beats per minute. For more detailed studies, resolution of the heart area is increased by increasing the time of each scan depth level (e.g. by modifying the scan area to 0.5 millimeter increments). With resolution in 0.5 millimeter increments, a user of the present invention, for example, is able to view the inside of each coronary artery. The CAD program means processes each of the signals received from each of the radar circuits and incorporates the results into a graphics program visible in real time display. For comparison purposes, CT and MRI resolution is in the order of 1–2 millimeters, but only with discrete tissue density changes. Ultrasound, now used for cardiac function analysis, fetal, bladder and gall bladder status, can detect certain details, but is depth planar.

Ultrasound systems are incapable of using multiple sound sources simultaneously to increase the scanning area or to increase image resolution. Thus, the present invention provides more accurate image reproduction and increased resolution as compared with conventional biologic imaging systems.

Other uses of the present multiple array ultra-wideband imaging system include: cardiac cathetefization for viewing blood vessels in an office environment at a nominal cost and with little associated risk; in the abdomen, the structure and function of the entire intestinal tract can be viewed and tumors, intimation, blockage, partial obstruction, gall stones/sludge, kidney stones, urine flow, bladder function can be inspected on a real-time basis without contrast or surgical invasion; as applied to the spine, the present invention is capable of detecting lesions with the same clarity as MRI or CT scanning systems, but operates without the restrictions of size, radiation exposure, and image production time. Additionally, the present invention detects motion within a particular structure, (e.g., mechanics of nerve impingement with motion, spondylolisthesis, segmental fixation and bone/soft tissue differentiation) to provide instant diagnosis verification.

EXAMPLE 2

In an alternative embodiment of the present invention, a cassette unit containing a plurality of radar circuits, an EPROM means, and a memory means is provided in combination with CAD programming software installed on a hospital's main computer. With this configuration, each cassette unit is removably connected to an outlet located in each hospital room for access to the main-frame computer. In this manner, a limited number of cassette units are employed utilizing a multi-user shared CAD application resonant on a hospital's main-frame computer. Thus, a system is provided which provides portability with accurate three dimensional imaging.

This embodiment may also be employed to produce interactive C-D ROM discs for teaching three dimensional anatomy, embryology, neuroanatomy, physiology and pathology, with "zoom" and motion capabilities. The unit is useful for physical diagnosis whereby hand palpation could be monitored to ensure that the physician is feeling the proper organ-(e.g., to differentiate the colon v. small bowel when palpated). Because the present invention is tissue-specific, a user is capable of diagnosing bronchitis, dissecting aneurysm, ligament tears bowel disease, tumor, appendicitis, ulcers, pancreatitis, dissecting aneurysm, ligament tears, strain, meniscal injuries and differentiating between each. The system may also be used in sports medicine and in monitoring the healing process of any tissue such as to detect an exact "complication" before an incision is reopened as well as to assist in determining whether reopening an incision is necessary. Similarly, uses in veterinary medicine are also envisioned. In forensic medicine, a radar autopsy may be performed and recorded. The system is also useful in "live time", percutaneous surgery and shows surgical instrument and anatomic structures.

EXAMPLE 3

An alternative embodiment of the present invention utilizes the translation of radar signals into X, Y and Z coordinates for immediate data incorporation into a CAD program to measure, plot, and assess variables relating to survey, landscape and remodeling construction applications. Although scanning times for survey, topographic and architectural structures utilizing the present invention extend for approximately a few tens of seconds, this is a fraction of the operation time for conventional site surveys.

This embodiment utilizes ultra-wideband circuit arrays to produce, transmit and receive radar voltage pulse signals, a translational software program resonant in an EPROM for translating the pulse signals into X, Y and Z coordinates, a memory means for storing the translated radar pulses and a CAD programming means resonant in a microprocessor for processing the translated signals into three dimensional survey and architectural images. This embodiment is a self-contained unit whereby the microprocessor is contained with the radar circuits, EPROM and memory means. The apparatus also includes a video display unit for realtime viewing during survey and architectural operation.

The reference zeroing process for each ultra-wideband radar circuit is accomplished by establishing a zero point for each circuit on an X and Y axis and incorporating the angle and distance of a radar echo signal to the reference zero point. The CAD program also incorporates the intensity of the echo signal and overlapping signal points from adjacent circuits and processes these signals through the programming means to produce a survey/architectural display formula. With no need for motion detection, the topographical, survey, architectural imaging system requires four (4) individual ultra-wideband radar circuit arrays to provide the necessary scanning capability for conventional applications. In the preferred embodiment, these four (4) ultra-wideband radar circuit arrays provide a zero to one hundred percent (100%) survey scan within ±10 minutes with one inch scan resolution at maximum range.

Small or large scale site surveys, including survey pins, site structures, plant materials, topographical data, and surface variables—ground cover, soil, pavement, water, marsh—are all incorporated into a single three-dimensional data source. The CAD programming means processes the translated radar pulses to produce real-time site redesign/modification, import of structures, plantings, and surface variables, and hard copy production of existing survey information. Videotape recording of the original or modified surveys is also provided. Accordingly, the present invention provides a portable unit capable of real-time three dimensional imaging is provided which possesses a low power factor and low operation costs parameters for use in the construction industry.

Thus, the present invention provides a three dimensional imaging system for application in biologic and construction applications. The present invention combines an ultra-wideband radar motion sensor circuit which produces, transmits and receives a voltage pulse signal with a translational program resonant in an EPROM for translating the pulses into X, Y and Z coordinates. A CAD programming means resonant in a microprocessor based computer system processes the translated radar signals into three dimensional images representative of an object, structure or survey being scanned. The present invention provides various configurations for stationary and portable uses and provides accurate fine resolution imaging as compared with conventional imaging technology.

Given the foregoing disclosure, it is evident that the benefits of the present invention may be extended and adapted to numerous types of commercial activities.

Although specific embodiments of the present invention have been described herein in detail, it is understood that variations may be made thereto by those skilled in the art without departing from the spirit of the invention or the scope of the appended claims.

What is claimed is:

1. An imaging system for producing a three-dimensional image of an object, comprising:

a plurality of ultra-wideband rapid sampler radar circuits which transmit and receive electrical voltage pulses;

a programmable memory means operatively connected with the plurality of ultra-wideband rapid sampler radar circuits for receiving and translating the electrical voltage pulses into signals representing three dimensional coordinates of the object; and a computer aided design means operatively connected to the programmable memory means for receiving and processing the signals representing three dimensional coordinates into a three-dimensional image of the object; wherein the plurality of ultra-wideband sampler radar circuits are arranged in rotational relationship with respect to one another and positioned a fixed distance from the object.

2. The system of claim 1 wherein each ultra-wideband rapid sampler radar circuit samples an electrical voltage pulse corresponding to a predetermined area of the object.

3. An apparatus for producing three-dimensional images of a scanned object, comprising:

a plurality of ultra-wide band radar circuits, each circuit operating as a pulse-echo system producing high speed electrical voltage pulses, each voltage pulse having a transmitted portion and a corresponding echo portion;

a plurality of transmit antennas connected to corresponding ultra-wideband radar circuits for transmitting the transmitted portion of the electrical voltage pulses;

a plurality of receiver antennas connected to corresponding ultra-wideband radar circuits for receiving the echo portion of the electrical voltage pulses;

a means for sampling the echo portion of the electrical voltage pulses, such that each transmitted portion is matched with its corresponding echo portion;

a programmable memory means cooperatively connected to the plurality of ultra-wideband radar circuits for receiving and storing the echo portion of the electrical voltage pulse;

translating means within the programmable memory means for translating the echo portion of the electrical voltage pulses into corresponding X, Y and Z coordinates; and a computer-aided design means attached to the programmable memory for receiving and processing the X, Y and Z coordinates to produce a three-dimensional image representative of the object.

4. The apparatus for producing three-dimensional images of an object as in claim 3 further comprising a memory means operatively connected to the programmable memory means and the computer aided design means, for storing the translated electrical signals for use by the computer aided design means.

5. The apparatus for producing three-dimensional images of an object as in claim 3 wherein each of the ultra-wideband radar circuits scans an area of approximately sixteen square inches.

6. A system for producing three-dimensional images of a scanned object comprising:

a plurality of ultra-wideband radar circuits, each of said circuits include a pulse repetition interval generator, a fixed reference delay means connected to the pulse repetition interval generator, a transmit pulse generator connected to the reference delay means, a transmit antenna connected to the transmit pulse generator, an adjustable delay means connected to the pulse repetition interval generator, a gating pulse generator connected to the adjustable delay means, an ultra-wideband radar receiver connected to the gating pulse generator, a receiver antenna connected to the ultra-wideband receiver, and a signal processing means connected to the ultra-wideband receiver, said transmit antenna emitting an electrical voltage pulse, said voltage pulse traveling to a point on, in or within said object, said ultra-wideband receiver sampling said voltage pulse at a time corresponding to a two way echo time of said voltage pulse;

a programmable memory means cooperatively interconnected to each of said ultra-wideband radar circuits to receive each of said voltage pulses;

translating means within the programmable memory means for translating the voltage pulses into X, Y and Z coordinates representative of an area on and within the object;

memory means operatively connected to the programmable memory means for storing the X, Y and Z coordinates corresponding to the translated voltage pulses; and computer-aided design means communicating with said programmable memory means and the memory means, for processing each of the translated voltage pulses to produce a three-dimensional image of the object.

7. The system for producing three-dimensional images of a scanned object as in claim 6, wherein the ultra-wideband radar circuits are arranged in rotational relationship with respect to one another and wherein the ultra-wideband radar circuits ore located in a fixed position relative to the scanned object.

8. A method for effecting the three dimensional scanning and image reproduction of an object, comprising the steps of:

producing an electrical voltage pulse from each of a plurality of ultra-wideband radar circuits, each electrical voltage pulse having a transmitted portion and a corresponding echo portion;

transmitting the transmitted portion of the electrical voltage pulses from an antenna associated with each ultra-wideband radar circuit;

receiving the echo portion of the electrical voltage pulse via receiving antennas associated with the ultra-wideband radar circuits by opening a sampling gate also associated with the ultra-wideband radar circuits, the sampling gates providing a means for relating a particular transmitted portion of the electrical voltage pulse with its corresponding echo portion;

transmitting the echo portion of the electrical voltage pulse to a programmable memory means, wherein the echo portion is stored;

translating the stored echo portion of the electrical voltage pulse into signals representing three dimensional coordinates of an area of the object being scanned;

storing the signals representing the three dimensional coordinates in a memory storage means; and processing the translated pulse signals into an image representative of the area on and within the object being scanned, said processing being performed by a computer aided design means resonant in a microprocessor.

* * * * *